United States Patent
Snaper et al.

(10) Patent No.: US 7,931,814 B2
(45) Date of Patent: Apr. 26, 2011

(54) ELECTRICALLY ENHANCED AQUEOUS FILTER AND METHOD THEREFOR

(76) Inventors: Alvin A. Snaper, Las Vegas, NV (US); Maxwell J. Goldberg, Las Vegas, NV (US)

( * ) Notice: Subject to any disclaimer, the term of this patent is extended or adjusted under 35 U.S.C. 154(b) by 128 days.

(21) Appl. No.: 12/485,795

(22) Filed: Jun. 16, 2009

(65) Prior Publication Data

US 2010/0314252 A1 Dec. 16, 2010

(51) Int. Cl.
*C02F 1/46* (2006.01)
(52) U.S. Cl. .................. 210/748.01; 204/554; 204/665; 422/22; 422/24
(58) Field of Classification Search .................. 422/22, 422/24; 210/748.01–748.1; 204/554, 665
See application file for complete search history.

(56) References Cited

U.S. PATENT DOCUMENTS

| | | |
|---|---|---|
| 3,228,799 A | 1/1966 | Rohrback |
| 3,615,828 A | 10/1971 | Fischer |
| 3,635,764 A | 1/1972 | Setser et al. |
| 3,811,184 A | 5/1974 | Niedrach et al. |
| 3,892,653 A | 7/1975 | Pacheco |
| 4,035,269 A | 7/1977 | Mastrorilli |
| 4,107,997 A | 8/1978 | Snaper |
| 4,304,132 A | 12/1981 | Snaper |
| 4,310,396 A | 1/1982 | Demaire et al. |
| 4,595,916 A | 6/1986 | Snaper |
| 5,089,107 A | 2/1992 | Pacheco |
| 5,225,291 A | 7/1993 | Rao |
| 6,689,270 B1 | 2/2004 | Evert |
| 6,798,080 B1 | 9/2004 | Baarman et al. |
| 6,911,273 B2 | 6/2005 | Faris |
| 6,929,740 B2 | 8/2005 | Hayes |
| 7,326,348 B2 | 2/2008 | Litz et al. |
| 2004/0026264 A1 | 2/2004 | Boden |

FOREIGN PATENT DOCUMENTS

WO WO 2007131324 A1 * 11/2007

* cited by examiner

*Primary Examiner* — Walter D Griffin
*Assistant Examiner* — Cameron J Allen
(74) *Attorney, Agent, or Firm* — Veronica-Adele R. Cao; Weiss & Moy, P.C.

(57) ABSTRACT

An alloy is created by melting aluminum, zinc, rare earth metals such as erbium and/or tellurium, and optionally vanadium. During cooling, the molten alloy is exposed to ultrasonic waves in order to prevent separation of the alloy into layers. The alloy is used for one electrode and a separate conductive element such as stainless steel or carbon is used for the other electrode in a water filter. A constant potential difference and electrical current is created between the two electrodes across the water. In an embodiment where carbon or zeolite is used as the filtration medium, the constant voltage and current increase bonding of ions in the filtration medium with pollutants in the water. In an embodiment wherein a mixed bed resin containing sodium ions and potassium ions is used as the filtration medium, the constant voltage and current increase the bonding of the sodium and potassium ions with residual chlorine ions in the water. The resulting sodium chloride salts and the potassium chloride salts also assist in regenerating the mixed bed resin.

5 Claims, 2 Drawing Sheets

ELECTRICALLY ENHANCED AQUEOUS FILTER AND METHOD THEREFOR

FIELD OF THE INVENTION

This invention relates generally to water filtration and, more particularly, to an electrically enhanced water filter and related method.

BACKGROUND OF THE INVENTION

Chlorine is the primary disinfectant for drinking water in the world. However, there is some concern over the use of chlorine compounds to disinfect drinking water. These concerns stem from the potential adverse health effects of the chemical by-products, such as chloroform, found in water as a result of their use. The EPA set a maximum contaminant level of THMs, like chloroform, in drinking water at 0.10 mg/L. But, because the benefits of pretreatment of our water supply with chlorine outweigh the risks associated with no treatment, chlorine is still used.

Despite the pretreatment of water, many people do not drink it directly out of the faucet because many impurities still remain in the water. People either purchase bottled water or purchase some type of filtration system for their homes or businesses.

There are several different types of water filters available: activated carbon filters, ion exchange units, reverse osmosis units, and distillation units.

Activated carbon filters remove/reduce many volatile organic chemicals (VOC), pesticides and herbicides, as well as chlorine, benzene, trihalomethane (THM) compounds, radon, solvents and many other chemicals found in tap water. Some activated carbon filters are moderately effective at removing some heavy metals. However, frequent filter changes are required. Following scheduled filter replacements is highly important to eliminate the possibility of channeling which reduces the contact between the contaminant and the carbon and therefore reduces efficiency, and the accumulation of bacteria in the filter.

Ion exchange units typically consists of permanent insoluble anions, kept electrically neutral by replaceable sodium cations. Zeolite is often used in ion exchange units. As the hard water flows through it, the magnesium and calcium cations in the water are drawn to the anions of the ion exchanger. Because the ion exchanger has a greater affinity for the calcium and magnesium ions than for the sodium ions, the harmless sodium ions replace the hardness ions of magnesium and calcium. In time, however, the amount of sodium ions will be depleted and the ion exchange process will cease. The ion exchange material will therefore need to be regenerated by passing high concentrations of Sodium Chloride (NaCl) solution through the ion exchange material, thereby replacing the magnesium and calcium ions with sodium ions. And, while this is helpful in softening water, it does not aid in the removal of residual chlorine.

Reverse osmosis units use a membrane that is semi-permeable, allowing pure water to pass through it, while rejecting the contaminants that are too large to pass through the tiny pores in the membrane. However, because reverse osmosis works against standard osmotic pressure, the process is generally fairly slow, producing roughly 15 gallons of purified water per day, and may require from 3 to 10 gallons of untreated water to make a single gallon of purified water. Furthermore, molecules that are molecularly smaller than water will not be blocked by the membrane. Therefore, pesticides, herbicides and chlorine will not be filtered from the water.

Distillation units require that water is boiled. However, organics such as herbicides and pesticides, with boiling points lower than 100° C. cannot be removed efficiently. It is also very expensive as distillation requires large amounts of energy and water.

The present invention is directed to an improved water filter that is enhanced with self-generated electricity, longer lasting, and more effective in the removal of chlorine and other pollutants.

SUMMARY OF THE INVENTION

In accordance with one embodiment of the present invention, a self-powered aqueous filter is disclosed. The filter comprises a housing, a filtration medium within the housing, a first electrode coupled to an interior surface of the housing, wherein the first electrode is comprised of an electrically conductive material, and a second electrode coupled to the interior surface of the housing, wherein the second electrode is comprised of an alloy consisting essentially of aluminum, zinc, and rare earth metals.

In accordance with another embodiment of the present invention, an improved water filter is disclosed. The filter comprises a housing, a filtration medium within the housing, a first electrode coupled to an interior surface of the housing, wherein the first electrode is comprised of stainless steel or carbon, and a second electrode coupled to the interior surface of the housing, wherein the second electrode is comprised of an alloy consisting essentially of between approximately 45% and approximately 55% aluminum, between approximately 45% and approximately 55% zinc, and a remainder of the alloy comprising rare earth metals.

In accordance with another embodiment of the present invention, a method of filtering water is disclosed. The method comprises the step of providing a water filter comprising a housing, a filtration medium within the housing, a first electrode coupled to an interior surface of the housing, wherein the first electrode is comprised of stainless steel or carbon, and a second electrode coupled to the interior surface of the housing, wherein the second electrode is comprised of an alloy consisting essentially of between approximately 45% and approximately 55% aluminum, between approximately 45% and approximately 55% zinc, and a remainder of the alloy comprising rare earth metals, and passing water through the filter.

The foregoing and other objects, features, and advantages of the invention will be apparent from the following, more particular description of the preferred embodiments of the invention, as illustrated in the accompanying drawings.

DETAILED DESCRIPTION OF THE PRESENT INVENTION

Figure 1:
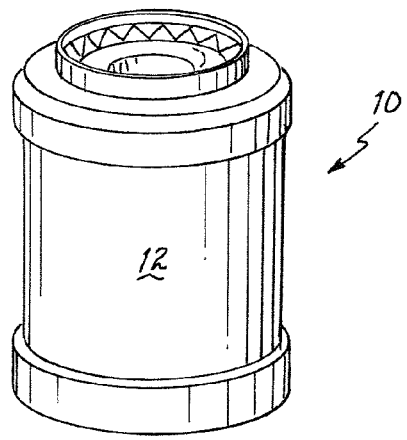
FIG. 1 is a perspective view of a water filter of the present invention.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

Figure 2:
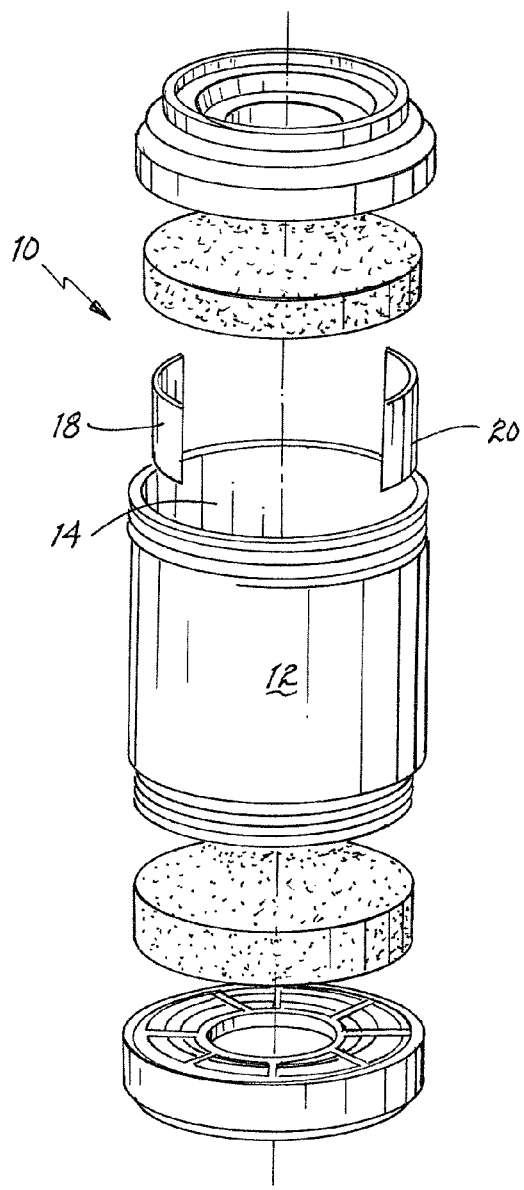
FIG. 2 is an exploded perspective view of the water filter of FIG. 1.
Figure 3:
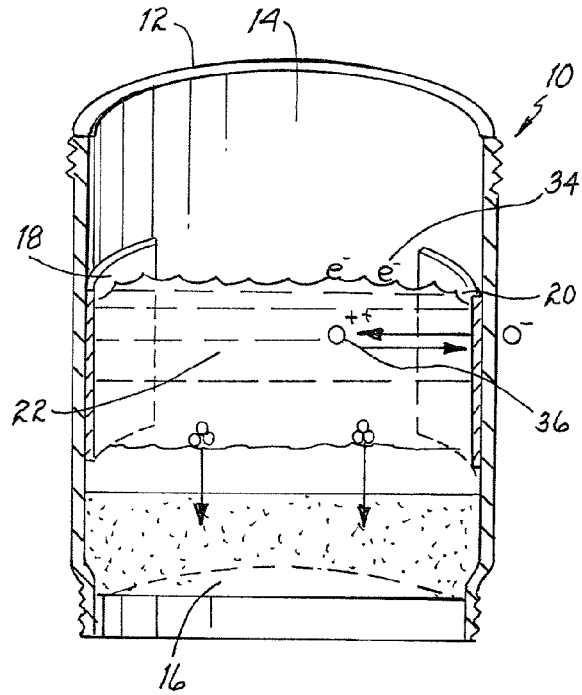
FIG. 3 is a cross-sectional view of FIG. 1.

In FIGS. 1-3, an improved water filter, hereinafter water filter 10, of the present invention is shown. In its simplest form, the water filter 10 comprises a housing 12, a first electrode 18, a second electrode 20, and a filtration medium 16 contained within the housing 12. The housing 12 will be made of non-conductive material so as to avoid electrical shorting of the electrodes 18/20. In one embodiment, the first electrode 18 and the second electrode 20 may each have a surface area of between approximately 3 sq. in. and 4 sq. in. It should be clearly understood, however, that the electrodes 18/20 may have any suitable surface area, the size being adjusted according to the capacity of the filter 10.

The first electrode 18 may be coupled to an interior surface 14 of the housing 12 and may be made of electrically conductive material. In one embodiment the first electrode 18 may be made of stainless steel and in another embodiment, the first electrode 18 may be made of carbon. It should be clearly understood that the first electrode 18 may be made of any electrically conductive material.

The second electrode 20 may also be coupled to an interior surface 14 of the housing 12, separated from the first electrode 18, and may be made of an alloy of aluminum, zinc, and rare earth metals. The alloy may contain between approximately 45% and approximately 55% aluminum and between approximately 45% and approximately 55% zinc with the remainder being rare earth metals such as erbium and/or tellurium. The alloy may also contain between approximately 0.001% and approximately 1% vanadium may also be present in the alloy. In one embodiment, the alloy may contain approximately 48% each aluminum and zinc; up to 3% erbium and/or tellurium; and up to 1% vanadium. In another embodiment, the alloy may contain approximately 45% aluminum and approximately 55% zinc (or approximately 45% zinc and approximately 55% aluminum) with only trace amounts of rare earth metals. Altering the composition of the alloy may increase the electrical output of the electrodes 18/20 and decrease their corrosion.

Figure 4:
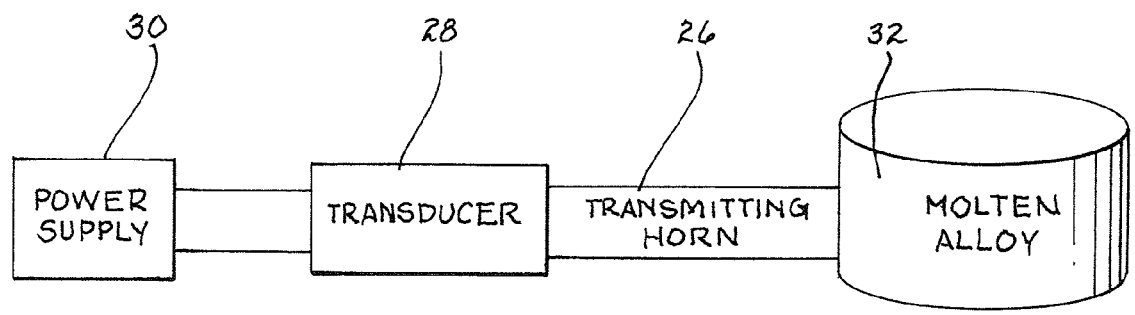
FIG. 4 is a diagram illustrating the process by which the alloy electrode is formed.

Aluminum, zinc, erbium, tellurium, and vanadium are known to be typically incompatible materials, which separate into layers when they are cooled from a molten state. This separation occurs because the materials are chemically incompatible. Referring to FIG. 4, this separation may be prevented with the use of ultrasonic waves. When the materials for the alloy are melted in a container 32, a transducer 28 is used to transform electrical energy from a power supply 30 into ultrasonic waves. The ultrasonic waves may have a frequency of between approximately 20 KHz and approximately 100 KHz so as to avoid cavitation in the molten alloy. The ultrasonic waves travel via a transmitting horn 26 to the container 32 causing vibration of the molten alloy. This ultrasonic wave agitation prevents the materials from separating during cooling.

The filtration medium 16 may be activated carbon, zeolite, or mixed bed resin. In one embodiment, the zeolite may be ZELBRITE®, but it should be clearly understood that substantial benefit may be obtained from the use of any zeolite.

When water 22, an electrically conductive solution, enters the filter 10, the first electrode 18 and the second electrode 20 become immersed and begin to generate an electrical output. No minimum level of water 22 is required for this to take place, as long as the filtration medium 16 is wet. In one embodiment, the electrical output, or potential difference between the first electrode 18 and the second electrode 20, may be approximately one volt. A current is also created from the flow of free electrons 34 across the water 22. Where the second electrode 20 has a surface area of between approximately 3 sq. in. and 4 sq. in., the current may be approximately 200 micro amps/sq. in. It should be clearly understood, however, that a different amount of current may be generated as the amount of current may be proportional to the surface area of the second electrode 20. It should also be clearly understood that while water 22 is the preferred aqueous solution, the filter 10 disclosed herein may be used to filter other electrically conductive solutions.

In a typical galvanic reaction between two metals that are immersed in an aqueous electrolyte, a similar electrical output occurs. However, one of the electrodes' materials eventually plates over the other electrode, thereby equalizing the cell potential and halting electrical output.

In the present invention, as ions 36 from the alloy of the second electrode 20 migrate toward the first electrode 18, ions of a dissimilar element present in the alloy are uncovered, drawing the migrating ion 36 back to the alloy of the second electrode 20. This prevents the ions 36 of the alloy of the second electrode 20 from plating over the first electrode 18. This also prevents any loss of mass of the second electrode 20. Therefore, with this quasi-galvanic reaction, the electrical output may continue for very long periods of time: ten years and longer.

In an embodiment where activated carbon or zeolite is used as the filtration medium 16, the constant electrical output and current across the water 22 promotes the bonding of ions in the filtration medium 16 with the pollutants in the water 22, thus leading to more effective filtration of those pollutants from the water 22. In an embodiment where a mixed bed resin is used as the filtration medium 16, the constant electrical output and current across the water 22 promotes the bonding of sodium ions and the potassium ions of the mixed bed resin with chlorine ions in the water 22. This leads to a complete removal of chlorine from the water 22. In addition, the resulting sodium chloride salts and potassium chloride salts precipitate to the mixed bed resin, thus regenerating it and extending its service life.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of filtering water comprising the steps of:
    providing a water filter comprising:
        a housing;
        a filtration medium within the housing;
        a first electrode coupled to an interior surface of the housing, wherein the first electrode is comprised of stainless steel or carbon; and
        a second electrode coupled to the interior surface of the housing, wherein the second electrode is comprised of an alloy consisting essentially of:
        between approximately 45% and approximately 55% aluminum;
    between approximately 45% and approximately 55% zinc; and
        a remainder of the alloy comprising rare earth metals;
    passing water through the filter; and
    creating an electrical current proportional to a surface area of the second electrode and a potential difference between the first electrode and the second electrode across water passing through the filter.

2. The method of claim 1 wherein the alloy is formed by:
melting the aluminum, zinc, and rare earth metals;
cooling the molten aluminum, zinc, and rare earth metals until solid; and
exposing the molten aluminum, zinc, and rare earth metals to ultrasonic waves during the cooling step.

3. The method of claim 1 further comprising the step of providing one of carbon and zeolite as the filtration medium and wherein the potential difference and the electrical current increase bonding of ions in the filtration medium with pollutants in the water.

4. The method of claim 1 further comprising the step of providing a mixed bed resin as the filtration medium, the mixed bed resin comprising sodium ions and potassium ions, and wherein the potential difference and the electrical current increase bonding of the sodium ions and the potassium ions of the mixed bed resin with chlorine ions in the water.

5. The method of claim 4 further comprising the step of regenerating the mixed bed resin with sodium chloride salt and potassium chloride salt produced by the combination of the sodium ions and the potassium ions of the mixed bed resin with chlorine ions.

* * * * *